Seymour & Pease.
Harvester Rake.
N° 20,394. Patented May 25, 1858.
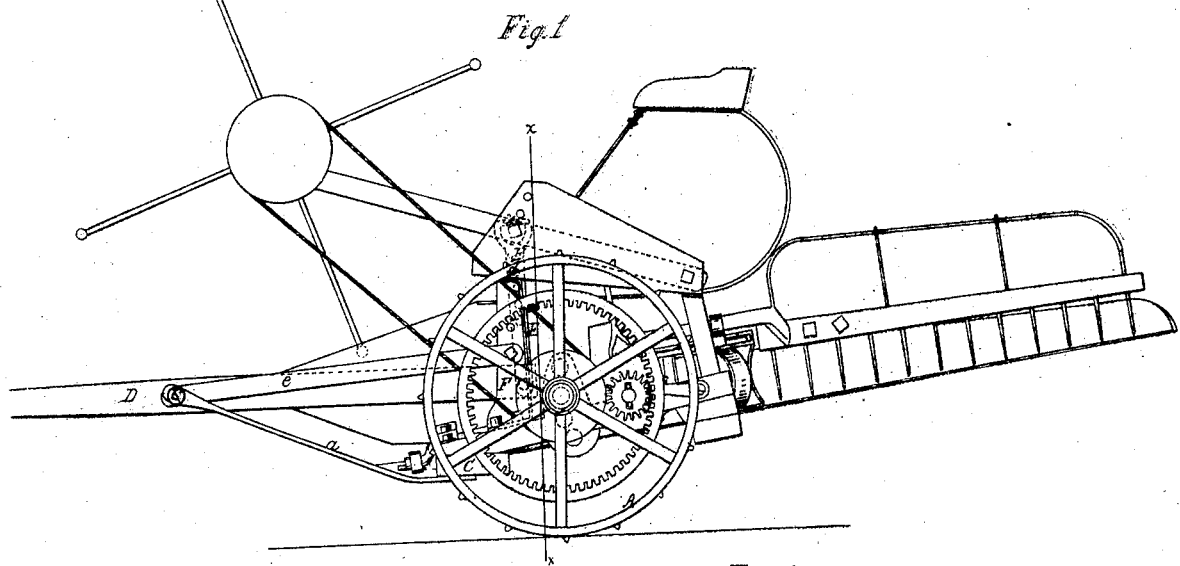
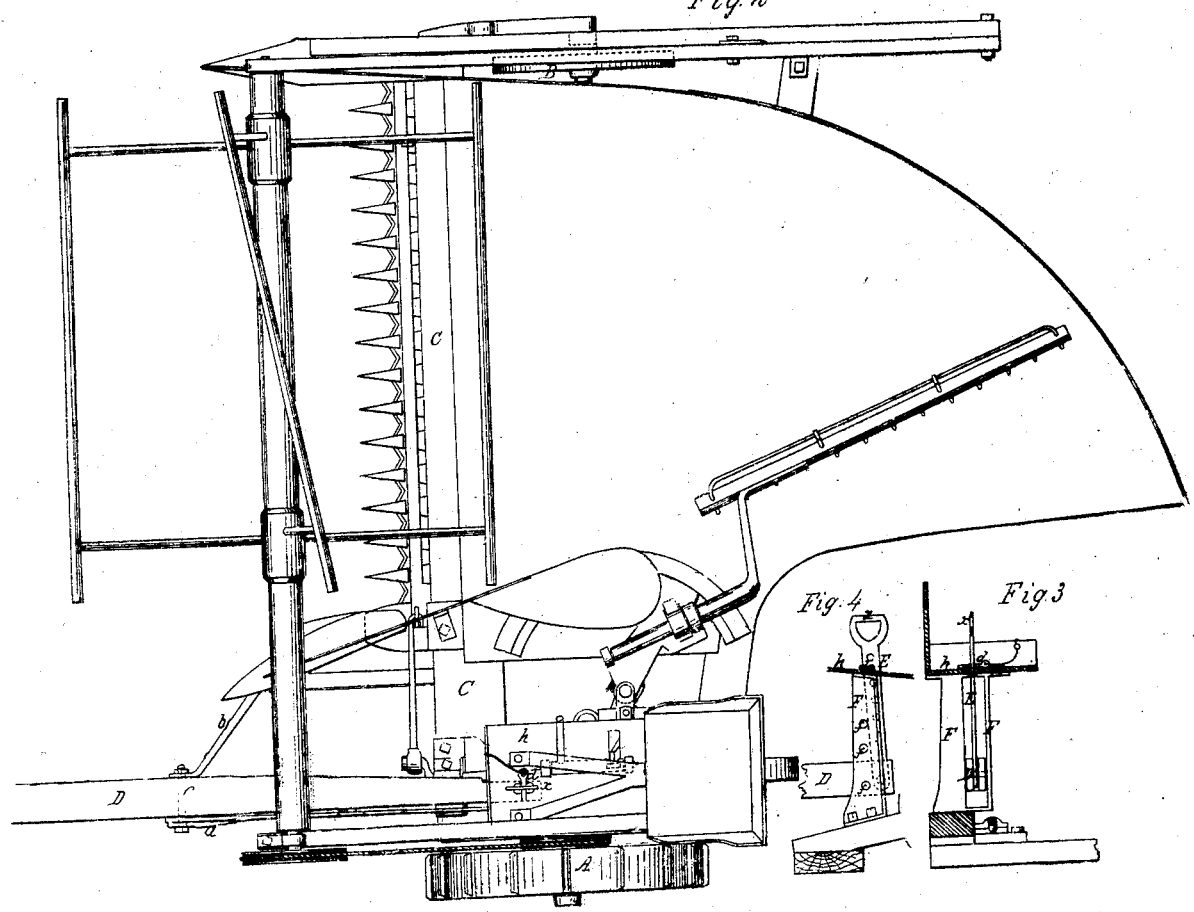

UNITED STATES PATENT OFFICE.

W. H. SEYMOUR AND H. PEASE, OF BROCKPORT, NEW YORK, ASSIGNORS TO W. H. SEYMOUR AND DAYTON S. MORGAN, OF SAME PLACE.

IMPROVEMENT IN HARVESTERS.

Specification forming part of Letters Patent No. 20,394, dated May 25, 1858.

*To all whom it may concern:*

Be it known that we, WILLIAM H. SEYMOUR and HENRY PEASE, both of Brockport, in the county of Monroe and State of New York, have invented a new and useful Improvement in Harvesting-Machines, of which the following is a full, clear, and exact description, reference being had to the accompanying drawings, making part of this specification, in which—

Figure 1 represents a side elevation of a harvesting-machine embracing our improvement. Fig. 2 represents a plan or top view of the same. Fig. 3 represents a vertical section at the line $x$ $x$ of Fig. 1, looking toward the front of the machine; and Fig. 4 represents a side view of the parts shown in Fig. 3.

In that class of harvesting-machines adapted to both reaping grain and mowing grass, and known as "combined reaping and mowing machines," it is important that the machine when used as a reaper should be capable of being set at the will of the operator to carry its cutting apparatus at different distances from the ground to cut a longer or shorter stubble, as circumstances may require; and it is also important that the machine should be capable, when used as a mower, of running with its cutting apparatus near to the surface of the ground, and, as nearly as may be, parallel thereto, whether that surface be plane or undulating. With a view to accomplish these objects, numerous contrivances have been invented to render the machine capable of running, when used for mowing grass, with its cutting apparatus free to accommodate itself to the undulations of the surface of the ground, and to render it capable, when used for reaping, of being adjusted to carry its cutting apparatus at any required height above the ground. Many of these contrivances work very well, but do not, in our judgment, combine in a sufficient degree simplicity of construction, convenience of arrangement, and ease of working.

Our invention, the object of which it is to supply these desiderata, consists in arranging the rear end of the tongue, to which the horses are harnessed, in a vertical guide behind the cutting apparatus, which guide permits the end of the tongue to play freely up and down, but prevents lateral play, hinging the tongue some distance in front of the cutting appartus by means of a horizontal pivot passed through the tongue and the front extremities of certain bars, which project forward to support the tongue, brace it laterally, and connect it with the main frame of the machine, making that portion of the tongue between the pivot and guide of sufficient length to serve as a lever for raising and lowering the cutting apparatus and adjusting the rear end of the tongue at different heights to hold the cutting apparatus at the proper height by means of a detent in the rear guide and upon a link-rod extending from the end of the tongue to within convenient reach of the hand of the person who conducts the machine and drives the horses by which it is drawn.

By reference to the drawings our invention will be more clearly understood, as it is therein represented in connection with the other parts of our machine. These parts, however, having been fully described in the several patents heretofore granted to us, we shall in this description refer to them only so far as may be necessary to explain the invention herein claimed.

The machine is balanced, like a cart, upon two wheels, A and B, the large one, A, of which drives the gearing. To the outer end of the finger-beam C two bars, $a$ $b$, are firmly attached. These bars extend upward and forward in advance of the beam to the tongue D, to which they are connected at a point several feet from its rear end by a bolt, $c$, passing horizontally through both the tongue and bars. This bolt serves as a fulcrum upon which the tongue oscillates up and down. A third bar, $e$, for supporting the tongue, extends from the bolt $c$ back to the frame. The rear end of the tongue extends some distance back of the cutter and plays in a vertical guide, F, underneath the foot-board connected with the driver's seat. A link-bar, E, is attached to the rear end of the tongue and extends upward far enough to be readily reached by the driver or conductor of the machine. This link has a series of holes in it, through which a pin or detent, $d$, is passed above the opening in the foot-board $h$, through which the link passes. This pin holds the link, and consequently the tongue, at any required height. By withdrawing the pin from the link the tongue is left free to play up and down in the guide. The tongue may also be held up by a pin passed beneath its end through the transverse holes in the guide. This latter mode of adjustment may be used in connection with the link-rod, if deemed advisable.

When the machine is used for mowing the platform and rake are removed by taking out the screw-bolts that connect them to the gear-frame and finger-beam, and the rear end of the tongue is left free to play loosely in its guide by removing the pin or other detent by which it is held up when the machine is adjusted for reaping. This arrangement permits the cutter to rise and fall to accommodate itself to the undulations of the surface of the ground, that it may cut a short stubble, and thus secure as nearly as possible the whole of the crop.

If it be required to elevate the cutter quickly to avoid stumps, stones, or other obstacles, it can readily be done by the driver by his seizing the handle $x$ of the link and pulling upward to lift the rear end of the tongue, which raises the front end of the bars $ab$ and through them the cutting apparatus. When the danger of striking an obstacle is past, the cutter can be instantly lowered by dropping the handle $x$.

When the machine is adjusted for reaping, so that the cutter is prevented from descending below any desired point by a pin in one of the holes of the guide F, the cutter is still free to rise and fall to the extent of the play left for the tongue in the guide above the pin.

We do not claim hinging the tongue to the frame of the machine, nor supporting it between guides, nor raising and lowering the cutter by elevating and depressing the rear end of the tongue when the latter is combined with a lever, screw, windlass, or other similar contrivance to aid the attendant of the machine in raising and lowering the end of the tongue; but

What we claim as our invention, and desire to secure by Letters Patent, is—

The arrangement of the tongue on a pivot in advance of the cutter, and in a guide provided with a detent in rear of the cutter, the whole being arranged, as herein described, so that the attendant can conveniently and readily, by means of the links, raise the cutter by lifting directly the rear end of the tongue, as herein set forth.

In testimony whereof we have hereunto subscribed our names.

WM. H. SEYMOUR.
HENRY PEASE.

Witnesses:
GEO. H. ALLEN,
AUSTIN HARMON.